No. 829,564. PATENTED AUG. 28, 1906.
F. C. AUSTIN.
CAR FENDER.
APPLICATION FILED AUG. 25, 1905.
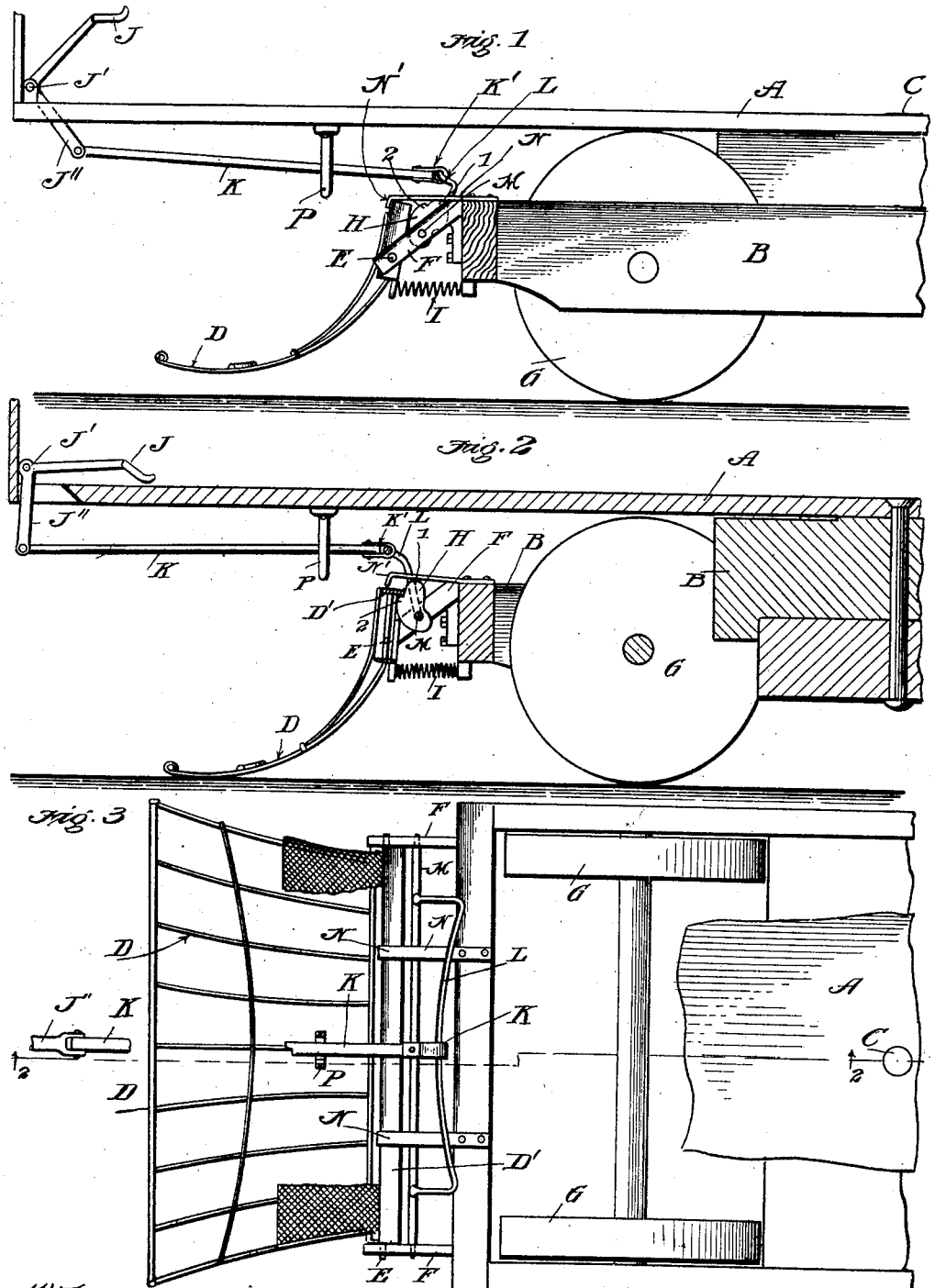

UNITED STATES PATENT OFFICE.

FOSTER C. AUSTIN, OF LOS ANGELES, CALIFORNIA.

CAR-FENDER.

No. 829,564.  Specification of Letters Patent.  Patented Aug. 28, 1906.

Application filed August 25, 1905. Serial No. 275,825.

*To all whom it may concern:*

Be it known that I, FOSTER C. AUSTIN, a citizen of the United States, residing at Los Angeles, in the county of Los Angeles and State of California, have invented new and useful Improvements in Car-Fenders, of which the following is a specification.

The object of my invention is to provide a fender for street-cars which will normally be elevated above the plane of the rail to prevent its contact therewith and with obstructions on the track or elevated portions of the road-bed; that can be dropped instantly into position in alinement with the track by the foot or hand of the motorman operating the car. I accomplish this object by means of the device described herein and shown in the accompanying drawings, in which—

Figure 1 is a side elevation of the front part of the truck of a car equipped with my improved fender, showing the fender in its elevated or normal position. Fig. 2 is a central vertical section taken on line 2 2 of Fig. 3, showing the fender in its abnormal or danger position depressed so as to move along in proximity to the surface of the road-bed. Fig. 3 is a plan thereof, the bed of the car being broken away for clearness of illustration.

In the drawings, A is the frame of the car, pivotally supported in the center of the truck B and connected thereto by the pintle-bolt C. The fender D is pivotally mounted on the projecting lugs E, secured to the forward frame of the fender and carried by the downwardly-projecting extensions F, rigidly secured by bolts or otherwise to the frame of the truck immediately before the front wheel G thereof. The fender will have a pivotal movement on the projecting lugs E, caused by the combined operation of the two cams H, carrying the shoulders 1 and 2 and the springs I, as follows: The foot-pedal J being pivoted, as at J', on the floor of the forward end of the car is provided with a downwardly-projecting extension J'', which is pivotally connected to the connecting-rod K. This connecting-rod extends rearwardly through the downwardly-projecting guide P, secured to the bottom of the frame of the car, and has a sliding connection, as at K', with the trip-rod L, which has a curve concentric with the center mounting of the truck— namely, at the pintle-bolt C—the purpose of which is to afford a sliding connection between the connecting-rod K and the curved rod L, so as to provide for curves in the track, the guide P always keeping the connecting-rod in alinement with the body of the car. The springs I, mounted between the truck and the fender and at a point on the fender below its pivotal point, raise the fender from the depressed into its elevated position, as shown in Fig. 1, and also serve to keep the transverse bar D' locked in its seat on the cams above the shoulder 2 when the fender is depressed.

In Fig. 1 the normal position of the fender is shown elevated to prevent contact with the obstruction on the line of the track, the pedal J being in a position above the floor of the car in the front thereof and easily accessible to the foot of the motorman operating the car. Whenever the motorman realizes by reason of the approach to a person on the track that the car may collide with such person, he immediately depresses the pedal J. This will throw the arm J'' of the pedal forwardly, carrying with it the connecting-rod K. This will in turn rotate the shaft M, on which the cams H are keyed. Immediately above and bearing upon the cams are the springs N. These springs are provided on their forward end with downwardly-projecting hooks N', the purpose of which is to engage the transverse bar D' on the upper free end of the fender and hold the upper end of the fender in its retracted position, as shown in Fig. 1. The hook N' will operate to hold the top of the fender back and lower portion of the fender proper in its normal or elevated position, as shown in Fig. 1. Immediately below the springs N are the cams H, which are provided with shoulders 1 and 2. (See Fig. 2.) The shoulder 1 when thrown forwardly will first elevate the spring N and carry the hook N' above the transverse bar D', permitting the upper end of the fender to move forwardly. This bar is caused to move forwardly by the bearing-surface below the shoulder 2 on the cam after the shoulder 1 has elevated the hook N' out of engagement with the transverse bar D'. When the pedal is depressed, as shown in Fig. 2, the shoulder 2 on the cam will pass below the transverse bar D' and engage the same and hold the pedal and the fender locked in the depressed or danger position. The fender will remain in this position until the pedal is elevated, which can easily be done by the motorman, which will operate to unlock the shoulder 2 on the cams from the transverse bar D', when the fender will be raised by the spiral springs I and will again assume the normal position shown in Fig. 1.

Having described my invention, what I claim as new, and desire to secure by Letters Patent, is—

1. In a street-car fender of the character herein described the curved trip-rod L pivotally mounted on the forward end of the truck, the said rod having a curve concentric with the pivotal point in the forward truck and having a sliding connection with the connecting-rod K, and the pedal J operatively connected therewith.

2. In a car-fender of the character herein described, the cam-shaft M carrying on its upper side the trip-rod L and carrying also the cams H provided with shoulders 1 and 2 in combination with the transverse bar D' on the upper end of the fender D, the fender D, the connecting-rod K and the pedal J arranged substantially as herein shown and described.

3. In a car-fender pivotally mounted on the forward end of the truck, the herein-described means to throw the forward free end of the fender into alinement with the road-bed comprising a horizontally-mounted trip-rod carrying thereon cams adapted on the rotation of the rod to contact with the rear portion of the fender and elevate the same, the said rod having an upper member lying in the circle concentric with the pivot on which the truck is mounted and means to throw the said upper member forward or backward substantially as herein shown and described.

4. A pivoted car-fender of the character herein described comprising a transversely-mounted rod having cams thereon adapted to engage the upper part of the fender and move the same forwardly upon the rotation thereof and throw the forward free end of the fender into or out of alinement with the road-bed, in combination with spiral springs secured below the pivotal axis of the fender, one end of each spring secured to the truck and the other end to the fender.

5. In a fender pivotally mounted on the forward end of the truck of the car, a portion of the fender extending below and a portion of the fender extending above its pivotal point; a transverse bar horizontally mounted in the rear of the fender and having cams mounted thereon adapted on the rotation of the bar to release and throw the upper portion of the fender forwardly, in combination with springs one end of which being secured to the front of the truck and the other end to the fender below its pivotal point, the tension on the springs being adapted to throw the forward free end of the fender into its upper or normal position upon the rotation backward of the cam and means to move the cam substantially as herein shown and described.

6. Means to operate a car-fender pivotally mounted on the forward end of a truck, the said fender having its downwardly and forwardly projecting end disposed below the pivotal point and a cam-engaging cross-bar disposed thereon above the pivotal point; a horizontally-mounted rod journaled in the rear of said fender and having cams thereon adapted to contact with the cross-bar of the fender when thrown forwardly in combination with springs secured one end of each to the truck and the other end to the fender below its pivotal point and adapted to exert an outward impulse on the lower portion of the fender and thereby elevate the forward free end of the fender when the cams are thrown backwardly and means to rotate the cam-carrying rod.

7. In a car-fender of the character herein described having its fender pivotally mounted on the forward end of the truck, the said fender having on its rear end a horizontal spring-engaging cross-bar, the said bar being mounted on said fender above its pivotal point and the main body of the fender disposed below the pivotal point; springs secured to the forward point of the truck, the forward free ends thereof adapted to project forwardly and having thereon cross-bar-engaging lugs adapted to engage the cross-bar on the fender and hold the free end of the fender in its elevated position.

8. In a car-fender cams carried by a rotary shaft and adapted to push the forward end of the fender downwardly, the cams having shoulders adapted to engage the upper cross-bar of the fender and lock the fender when in the depressed position.

9. In a car-fender of the character herein described metal springs attached to the truck and carrying hooks on their free ends and adapted to engage the upper swinging end of the fender and hold it in its normal position.

In witness that I claim the foregoing I have hereunto subscribed my name this 18th day of August, 1905.

FOSTER C. AUSTIN.

Witnesses:
   HENRY T. HAZARD,
   G. E. HARPHAM.